2,118,831

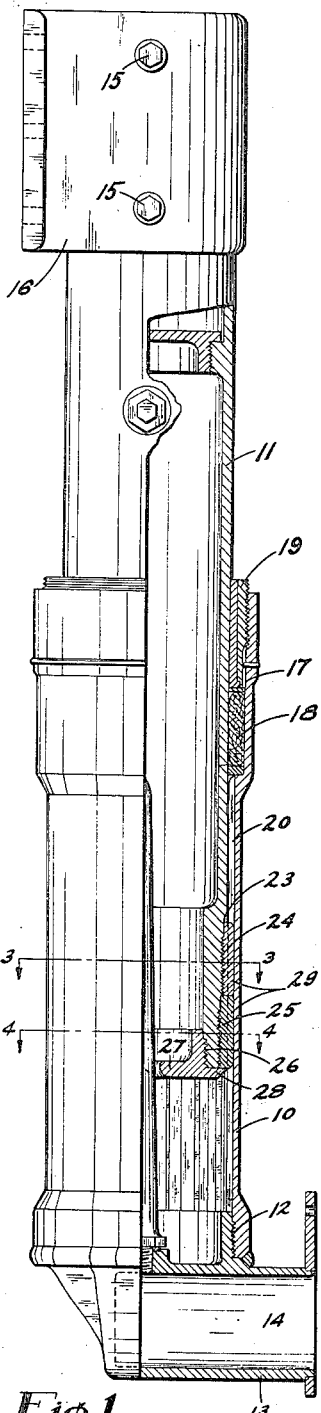
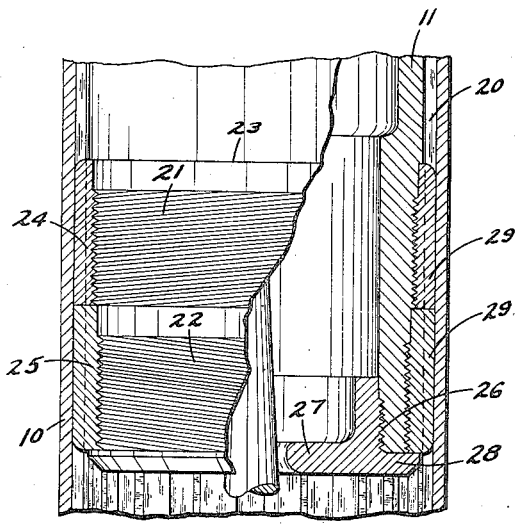
Fig. 2
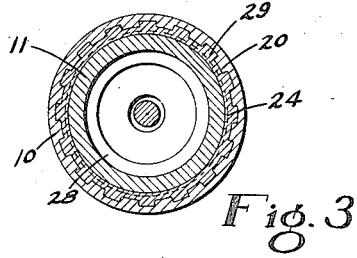
Fig. 3
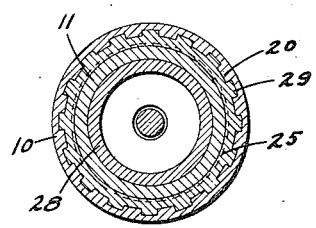
Fig. 4
Fig. 1
JOHN F. WALLACE
INVENTOR
BY *John E. Renfer*
ATTORNEY Patented May 31, 1938

UNITED STATES PATENT OFFICE 2,118,831

SHOCK ABSORBER CONSTRUCTION

John F. Wallace, Shaker Heights, Ohio, assignor to The Cleveland Pneumatic Tool Company, Cleveland, Ohio, a corporation of Ohio Application October 24, 1935, Serial No. 46,549
Renewed June 3, 1937

13 Claims. (Cl. 267—64)

This invention relates broadly to a device wherein tubular elements are mounted in telescopical relation and locked against relative rotation by means of splines or the like.

One object of this invention is to produce an improved construction including a duality of cylinder elements, one slidable within the other and locked thereto against relative rotation, as commonly used in the construction of shock absorbers or the like.

Another object of this invention is to provide at least one of the aforesaid cylinder elements with a removable splined portion secured thereto against relative movement when located for operative engagement with the corresponding splines of the other cylinder element.

Other objects and advantages more or less ancillary to the foregoing reside in the specific construction and aggroupment of the elements peculiar to this structure, as will become apparent from a more complete examination of this specification.

In the drawing which illustrates a preferred form of the invention:

Fig. 1 is an elevational view partly in section illustrating an improved shock absorber embodying the invention.

Fig. 2 is an enlarged view partly in section of a portion of the device shown in Fig. 1.

Fig. 3 is a cross sectional view taken in a plane indicated by line 3—3 in Fig. 1.

Fig. 4 is a cross sectional view taken in a plane indicated by line 4—4 in Fig. 1.

In the present embodiment of the invention as illustrated in detail in the accompanying drawing, there is shown a shock absorber comprising a lower cylinder 10 having an upper cylinder 11 reciprocable therein. The lower end of the cylinder 10 is threaded as at 12 to receive means 13 which is welded thereto against relative rotation, and provided with an enlarged bore 14 disposed at right angles with the cylinder 10. Within the bore 14 is usually mounted a shaft adapted to receive the landing gear of an aeroplane. To the upper end portion of the upper cylinder 11 is secured by bolts 15 means 16 for attaching said cylinder to some suitable part of an aeroplane fuselage. The upper end portion of the lower cylinder 10 is provided with a counterbore 17 adapted to receive a packing 18 engageable with the external wall of the tube 11. The compression of the packing 18 may be regulated by a nut 19 accommodated within the upper end of the counterbore 17.

Referring now more particularly to the present invention, it will be understood that since the landing gear of the aeroplane is secured to the end of the lower cylinder 10 in offset relation with the longitudinal center axis thereof, it is necessary to lock the lower cylinder against rotation relative to the upper cylinder. To accomplish this end, the inner wall of the lower cylinder 10 is provided with splines 20 extending longitudinally thereof from the bottom of the counterbore 17 to the lower threaded end portion 12. The upper cylinder 11, which is normally formed with a smooth external wall, has its lower end provided with two screw threaded portions 21 and 22, the former being a right-hand thread of an outside diameter somewhat smaller than that of the normal diameter of the cylinder, thus forming with the latter an annular shoulder 23. The screw threaded portion 22 is formed with a left-hand thread of an outside diameter somewhat smaller than the root diameter of the right-hand thread provided on the portion 21. Mounted on the threaded portion 21 in screw tight abutting engagement with the annular shoulder 23, there is an internally threaded sleeve or nut 24 of an external diameter substantially equal to the root diameter of the splines 20 formed in the lower cylinder 10. Similarly mounted on the threaded portion 22 in screw tight abutting engagement with the nut 24, there is a nut 25, which is accurately machined to come flush with the end wall of the cylinder 11. The internal lower end portion of the upper cylinder 11 is also threaded as at 26 to receive a plug 27 having a flange 28 extending over the end of the cylinder in abutting engagement with the corresponding end wall of the nut 25. While the nuts 24 and 25 are thus assembled on the end of the upper cylinder 11, the external wall thereof is accurately machined to form longitudinally disposed splines 29 corresponding to the splines 20 of the lower cylinder, with which they are capable of interengagement for slidable movement relative thereto.

In the operation of the device, let us assume that a torque in a clockwise direction in Fig. 3 is applied to the lower cylinder 10 and that the upper cylinder 11 is locked against rotation by the means 16 secured to some suitable part of an aeroplane fuselage. Due to the interengagement of the splines 29 formed on the nuts 24 and 25 with the splines 20 provided within the lower cylinder 10, the torque imparted to the latter in a clockwise direction will be transmitted to the nuts 24 and 25, thus tending to rotate the nuts relative to the upper cylinder 11. By virtue of the operative engagement of the nut 24 with the right hand screw threaded portion 21 and the similar engagement of the nut 25 with the left hand screw threaded portion 22, the torque in a clockwise direction will tend to move the nuts toward each other, which movement is prevented due to the abutting engagement of the nut 25 with the nut 24. When a torque in a counterclockwise direction is applied to the lower cylinder 10 and consequently to the nuts 24 and 25, it will tend to rotate the nuts in a counterclockwise direction. Since the nut 24 is in operative engagement with the right hand screw threaded portion 21, and the nut 25 with the left hand screw threaded portion 22, the nuts will tend to move away from each other, which movement is prevented due to the end engagement of the nut 24 with the annular shoulder 23. The separation of the nuts is further prevented due to the end engagement of the nut 25 with the flange 28 of the plug 27.

From the foregoing description, it will clearly be understood that the nuts 24 and 25 are secured to the cylinder or tubular member 11 in a manner preventing the rotation of the latter relative to the nuts, and consequently relative to the cylinder 10 irrespective of the direction of the torque applied thereto. It will further be understood that upon removal of the tubular element 11 from the cylinder 10, the splined portion of the former or the nuts 24 and 25, can readily be replaced without necessitating the replacement of the entire unit, reducing thereby the cost of operation.

Although the foregoing description is necessarily of a detailed character, in order to completely set forth the invention, it is to be understood that the specific terminology is not intended to be restrictive or confining and it is to be further understood that various rearrangements of parts and modification of structural detail may be resorted to without departing from the scope or spirit of the invention as herein claimed.

I claim:

1. In a device of the character described, a duality of cylinder elements one slidable within the other, means carried by each of said elements capable of interengagement with each other for preventing relative rotation between said elements, one of said means being integrally secured to one of said elements and the other of said means detachably secured to the other of said elements, and left and right hand screw threaded connections between said last means and last element for preventing relative movement therebetween during the interengagement aforesaid.

2. In a device of the character described, a cylinder having a tubular member slidable therein, means within said cylinder integral therewith capable of interengagement with means detachably secured on said tubular member for preventing rotation between the latter and said cylinder, and left and right hand screw threaded connections between said last means and tubular member for preventing relative movement therebetween during the interengagement aforesaid.

3. In a device of the character described, a cylinder having a tubular element slidable therein, a duality of members detachably secured to said tubular element, similar means on said members and within said cylinder capable of interengagement for preventing relative rotation between said members and cylinder, and means including a left and a right hand screw threaded connection between said members and tubular element for preventing relative rotation therebetween during the interengagement of the similar means aforesaid.

4. In a device of the character described, a cylinder having a tubular member slidable therein, splines within said cylinder, splined means detachably secured on said tubular member capable of interlocking engagement with the splines of said cylinder against rotation with respect thereto, and a connection between said splined means and said tubular member formed and disposed in a manner whereby the former due to the interlocking engagement aforesaid is locked to the latter against relative movement.

5. In a device of the character described, a cylinder having a tubular element slidable therein, a duality of members detachably secured to said tubular element, means within said cylinder and on said members in interlocking engagement with each other for preventing relative rotation between said cylinder and members, and a connection between said members and tubular element formed and disposed in a manner whereby said members due to the interlocking engagement aforesaid are locked to said tubular element against relative movement.

6. In a device of the character described, a cylinder having a tubular member slidable therein, a shoulder on said member, a duality of elements detachably secured to said member one in forcible end engagement with the other and with said shoulder, connecting means between said member and elements whereby rotation in either direction of the former relative to said elements is prevented due to the forcible end engagement aforesaid, and means within said cylinder and on said elements in interengagement with each other for locking said cylinder and elements against relative rotation.

7. In a device of the character described, a cylinder having a tubular member slidable therein, splines within said cylinder longitudinally thereof, splined means on said member in interlocking engagement with the splines of said cylinder for locking the latter against rotation relative to said member, said splined means including a duality of elements detachably secured to said member, and means including screw threaded connections between said elements and member for locking the latter against rotation relative to said elements.

8. In a device of the character described, a cylinder having a tubular member slidable therein, longitudinally disposed splines on the inner wall of said cylinder, a left and a right hand screw threaded portion on said member, a nut on each of said portions mounted thereon in screw tight engagement with each other and with said member in a manner preventing the rotation of the latter relative to said nuts, and splines formed on said nuts engaging with the splines of said cylinder for locking the latter against rotation relative to said nuts.

9. In a shock absorber, a cylinder having splines formed on its inner wall, a tubular element slidable within said cylinder formed with a screw threaded end portion of differential diameters, screw threaded splined means detachably secured on said screw threaded end portion in interlocking engagement with the splines of said cylinder against relative rotation, the threads of said screw threaded end portion formed and disposed in a manner adapted to receive said splined means to prevent movement of said tubular element relative thereto during the interengagement aforesaid.

10. In a shock absorber, a cylinder having splines formed on its inner wall, a tubular element slidable within said cylinder, splined means detachably secured on said tubular element capable of interlocking engagement with the splines of said cylinder against relative rotation, and a screw threaded connection between said tubular element and splined means including screw threads disposed in opposite directions.

11. In a shock absorber, a cylinder having splines formed on its inner wall, a tubular element slidable within said cylinder, splined means detachably secured on said tubular element capable of interlocking engagement with the splines of said cylinder against relative rotation, and a duality of screw threaded connections between said tubular element and splined means, one of said connections being formed with screw threads in a direction adversed to that of the screw threads of the other connection.

12. In a device of the character described, a duality of telescopically mounted elements, means carried by each of said elements capable of interengagement with each other for preventing relative rotation between said elements, and a left and right hand screw threaded connection between one of said elements and its respective means for preventing relative movement therebetween during the interengagement aforesaid.

13. In a device of the character described, a duality of telescopically mounted elements, splines on each of said elements in interlocking engagement for preventing relative rotation between said elements, and means for detachably securing one of said elements to its respective splines including screw threads therebetween disposed in opposite directions.

JOHN F. WALLACE.